Jan. 12, 1960 L. A. ROSER ET AL 2,920,462
APPARATUS FOR QUICK FREEZING FOOD ITEMS
Filed April 5, 1956 2 Sheets-Sheet 2
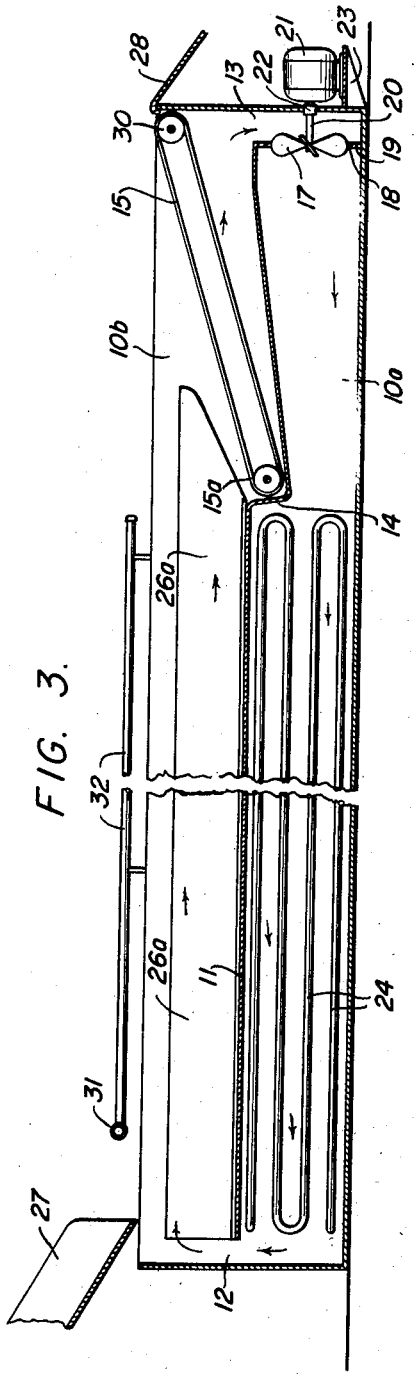
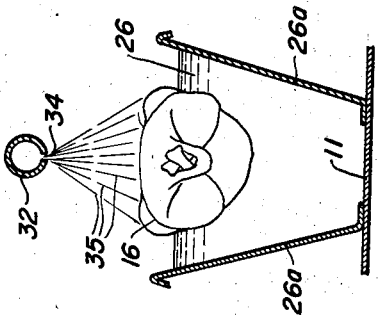
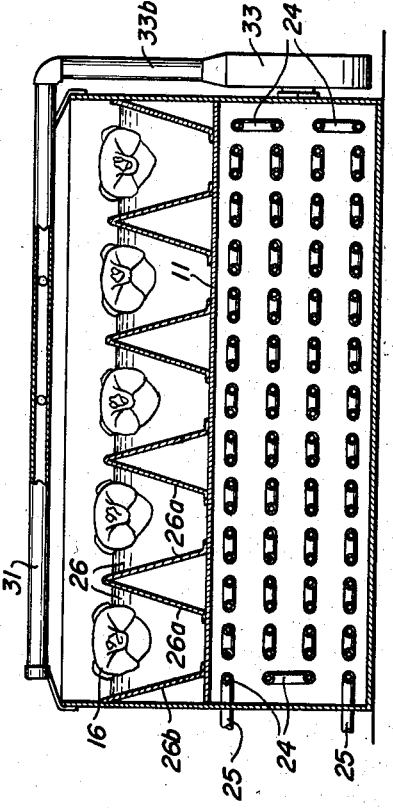
INVENTOR.
LOUIS A. ROSER
GLEN A. ROSER
BY
ATTORNEYS

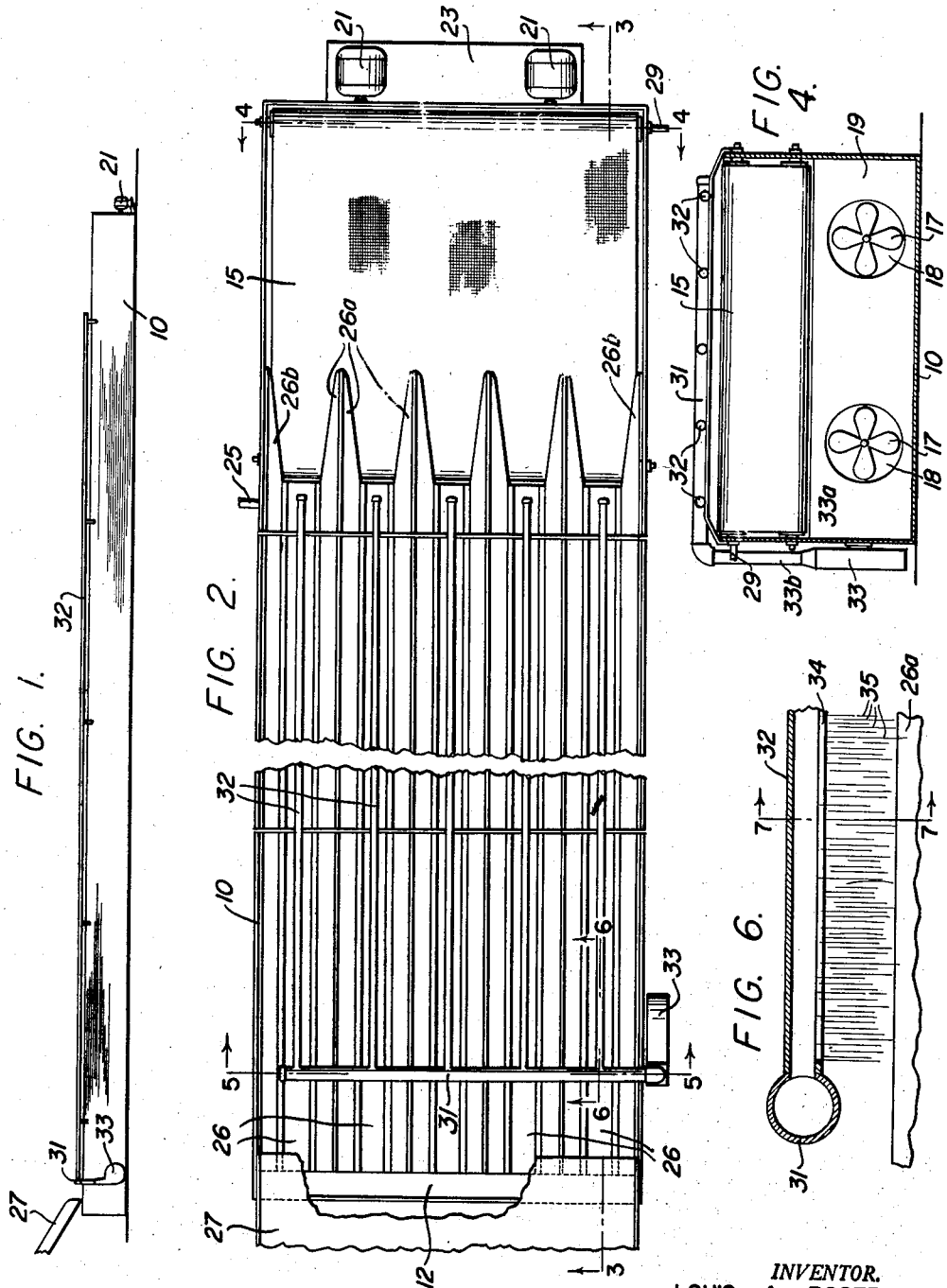

United States Patent Office 2,920,462
Patented Jan. 12, 1960

2,920,462
APPARATUS FOR QUICK FREEZING FOOD ITEMS

Louis A. Roser and Glen A. Roser, Salt Lake City, Utah

Application April 5, 1956, Serial No. 576,439

4 Claims. (Cl. 62—374)

This invention relates to methods and apparatus for quick freezing food items as a means of preserving them against spoilage. It is concerned particularly with quick freezing brine-buoyant items of food, especially dressed poultry.

Dressed turkeys and chickens are produced in great number by various packing establishments, and are customarily quick frozen for storage and marketing purposes. Brine baths are often employed for the purpose, but, in accordance with usual practice, leave much to be desired from the standpoints of efficiency and economy of handling, control of the freezing operation, and color and texture of the frozen product.

Our invention greatly improves existing practice in the above respects. Among its objects are to efficiently transport brine-buoyant food items through a freezing bath of brine, while insuring rapid and substantially uniform freezing thereof; to economically achieve close control of the freezing operation; to conserve working space; to enable effective handling of a variety of different sizes of items by the same machine, without necessitating structural alterations of any kind; and, especially, to facilitate the mass production of quick frozen, dressed poultry having superior texture and color.

Outstanding features of the invention are the utilization of brine circulation as the agency of transportation for the items to be frozen; the flooding of unsubmerged portions of the floating items with brine during travel of such items through the bath; and the guiding of travel of the floating items along the bath by means of a flume or flumes which diverge upwardly in cross-section and, thereby, with proper brine level regulation, accommodate a variety of sizes of the items being processed.

Additional objects and features of the invention will become apparent from the following detailed description of the particular preferred form of apparatus illustrated in the accompanying drawings.

In the drawings:

Fig. 1 represents a side elevation of apparatus embodying the invention and especially adapted for the quick freezing of dressed poultry on a mass production basis;

Fig. 2, a top plan view of the apparatus of Fig. 1 drawn to a considerably enlarged scale, intermediate portions being broken out for convenience of illustration;

Fig. 3, a longitudinal vertical section taken on the line 3—3 of Fig. 2;

Fig. 4, a transverse vertical section taken on the line 4—4 of Fig. 2;

Fig. 5, a similar section taken on the line 5—5 of Fig. 2 and drawn to a still larger scale;

Fig. 6, a fragmentary longitudinal vertical section taken on the line 6—6 of Fig. 2 and drawn to an even larger scale; and Fig. 7, a transverse vertical section taken on the line 7—7 of Fig. 6.

Referring to the drawings:

In its illustrated form, the apparatus comprises an elongate rectangular tank 10 fabricated from a material resistant to the corrosive action of a brine solution. Stainless steel is an ideal material, and throughout the description of the apparatus it is to be understood that such or equivalent material is preferably employed for all surfaces contacted by brine. Structural reinforcing and other members which are not ordinarily contacted by brine may be of any other suitable material, such as ordinary structural steel.

The interior of tank 10 is divided into upper and lower sections by means of a horizontal partition wall 11, which extends longitudinally of the tank intermediate the height of the latter, and which terminates short of the ends of the tank to provide transverse, brine-circulating passages 12 and 13 at opposite ends of the tank, respectively. One end portion of the partition wall 11 is advantageously stepped downwardly, as at 14, Fig. 3, to accommodate an item discharge conveyer 15 with its receiving end 15a substantially flush with the upper level of partition wall 11.

In accordance with the method of the invention, the brine-buoyant food items to be processed, turkeys, chickens, and other dressed poultry in the present instance, see 16, Fig. 5, are introduced sequentially into a freezing bath of brine, and are transported along the length of such bath by flow of the brine from one end to the other thereof.

For carrying out this aspect of the method to best advantage, the illustrated apparatus utilizes impellers 17 for circulating the brine within the tank 10. Such impellers are mounted for rotation within respective, concentric, circulation ports 18, Fig. 4, provided in a transverse wall 19 which separates the lower section 10a of the tank from brine-circulating passage 13.

The impellers 17 are rigidly affixed to respective shafts 20, which are prolongations in suitable manner of the drive shafts of respective electric motors 21 and extend into the tank through suitable packing glands 22, the motors being conveniently mounted on brackets 23 secured to the tank 10 exteriorly thereof.

As so provided, the impellers 17 rotate in a direction to draw brine from the upper section 10b of the tank down through passage 13, and to propel it forcibly into the lower section 10a of the tank at the discharge end thereof and toward the feed end thereof. Thus, the body of brine within tank 10 is caused to flow forcibly from the feed end of the tank to the discharge end thereof in the upper section 10b and vice versa in the lower section. Such forced circulation of the body of brine is carried on continuously throughout the operation of the apparatus.

It is preferred to locate the impellers 17 as illustrated, but this is not critical, and it will be apparent that they may be located as found most suitable in the many different constructions of the apparatus that may be utilized in particular instances.

It is necessary that the body of brine be maintained at requisite freezing temperature in accordance with well-known practice in the art. For this purpose, elongate refrigeration coils 24 are provided within the forward portion of the lower section 10a of the tank, preferably extending from the feed end of the tank to the step 14 in partition wall 11, as is illustrated in Fig. 3. These coils are supplied with a refrigerating fluid by connection, at 25, Fig. 5, with any well-known mechanical refrigeration system, it being understood that the refrigerating fluid is circulated through the coils 24 in customary manner, as required, under the control of instruments (not shown) well-known in the art.

It is a feature of the method that the items to be frozen are introduced into and constrained to travel through the brine bath in longitudinal, side-by-side rows. For this purpose, a transverse series of longitudinal flumes 26 are superimposed on partition wall 11 in any suitable manner, for example, as illustrated, by welding inverted V-shapes 26a to the upper surfaces of partition wall 11, intermediate its width, in longitudinally extending and mutually spaced relationship, and by similarly welding sloping end pieces 26b to such partition wall along the longitudinal margins thereof. As so constructed, the flumes 26 diverge, respectively, in cross section from bottom to top thereof, and enable the apparatus to accommodate a variety of different sizes of items to be frozen, by merely adjusting the level of brine in the tank, which may be accomplished by introducing additional brine into the tank in any suitable manner or by draining brine from the tank through a drain of conventional type (not shown).

The items to be frozen are introduced into the brine bath sequentially and continuously along the width of a feed apron 27, Figs. 1 and 2, which advantageously extends from the termination of a production line or lines (not shown) to the feed end of the tank 10, above the open top thereof. The items slide down the apron 27 and into the feed ends of the flumes 26, from where they are buoyantly carried along the lengths of such flumes to the discharge conveyer 15 for conveyance to the discharge apron 28 or other suitable discharge arrangement.

The discharge conveyer 15 is advantageously a stainless steel web conveyer belt, so that the items can drain as they emerge from the bath, the drainage dropping back into the tank. It is preferably driven through a variable drive mechanism of any well-known type, connected, for example, to the shaft 29 of the head sprocket drum 30 of the belt conveyer. The speed of travel of the web belt 15, as determined by the particular setting of the variable drive mechanism, may be utilized to determine the rate of travel of the items along the lengths of the respective flumes, even though the brine circulates at a faster rate. This is so because the items travel in single file along the flumes, and are restrained in their travel by those items which are ahead of them in the travel of the respective files along the length of the tank.

It can be seen that the possibility of accommodating the width of each flow channel to the size of the items to be frozen is a great advantage in the processing of poultry, where the size of the birds being handled will vary from time to time during the course of the processing operation.

It should be noted that the buoyant items to be frozen, see 16, Fig. 5, are only partially submerged in the brine during their travel along the length of the bath. In order to insure uniform freezing throughout the item and to prevent discoloration, it is a feature of the method of the invention that brine from the bath is pumped to locations above the bath, and is flowed back into the bath over the unsubmerged portions of the items, from above the level of the bath.

For this purpose, the apparatus is provided with a piping system, comprising in the illustrated instance a transverse header 31 and a transverse series of longitudinal distribution lines 32, the latter being advantageously centered 35 of brine along the lengths of the respective flumes.

A pump 33 has its intake 33a communicating with the interior of the tank 10, preferably with the lower section thereof adjacent the refrigeration coils 24, and has its discharge 33b connected with the header 31, so as to continuously draw brine from the tank and flow it into and through the overhead piping system. Such brine is flowed over the unsubmerged portions of the floating items to be frozen, by any suitable means, preferably restricted discharge slots 34 provided along the undersurfaces of the distribution lines 32, see particularly Figs. 6 and 7, so as to form a substantially continuous curtain 35 of brine along the lengths of the respective flumes.

Whereas this invention is here illustrated and described with respect to a presently preferred embodiment thereof, it is to be understood that various changes may be made within the scope of the following claims, without departing from the essential teachings hereof.

We claim:
1. Apparatus for quick freezing buoyant food items, comprising an elongate brine tank adapted to receive and retain a body of brine; a horizontal partition wall extending longitudinally of the tank, intermediate its height and short of its ends, to divide said tank into an upper flow channel and a lower flow channel intercommunicating at their respective opposite ends; means at one end of said tank for continuously introducing food items thereinto; means at the opposite end of said tank for continuously removing said food items therefrom; means including an impeller and a drive therefor for circulating the body of brine within and along said tank, so that the upper portion thereof above said partition wall continuously travels from said one end of the tank to said opposite end thereof; means for refrigerating the brine; means for passing brine from said tank to locations above said tank; and means for continuously flowing brine from said locations above the tank onto food items floating on the body of brine within said tank.

2. The apparatus of claim 1, wherein the refrigerating means is disposed in the lower flow channel.

3. The apparatus of claim 2, wherein the horizontal wall is stepped downwardly adjacent the discharge end of the tank; and wherein the means for discharging food items from the tank comprises an endless conveyer having its feed end disposed at said stepped portion of the horizontal wall, below the level of the latter, the refrigerating means being positioned forwardly of said stepped portion.

4. The apparatus of claim 1, wherein the means for passing brine from the tank to above the tank comprises a piping system and pump means associated therewith, said system having its feed disposed below the horizontal partition wall; and wherein the means for flowing the elevated brine onto floating food items comprises discharge nozzles disposed over the tank.

References Cited in the file of this patent

UNITED STATES PATENTS

| 1,822,718 | Vucassovich | Sept. 8, 1931 |
| 2,080,103 | Zarotschenzeff | May 11, 1937 |